United States Patent
Ciniglio

(10) Patent No.: US 7,490,389 B1
(45) Date of Patent: Feb. 17, 2009

(54) SWIVEL SNAP HOOK UNIT

(75) Inventor: John T. Ciniglio, Setauket, NY (US)

(73) Assignee: Meyco Products, Inc., Melville, NY (US)

( * ) Notice: Subject to any disclaimer, the term of this patent is extended or adjusted under 35 U.S.C. 154(b) by 170 days.

(21) Appl. No.: 11/506,666

(22) Filed: Aug. 18, 2006

(51) Int. Cl.
*F16B 45/00* (2006.01)

(52) U.S. Cl. .................................... 24/600.9; 24/601.5

(58) Field of Classification Search ............... 24/318, 24/321, 369, 165, 199, 600.9, 601.2, 601.4, 24/265 H, 601.5; 4/503
See application file for complete search history.

(56) References Cited

U.S. PATENT DOCUMENTS

| | | | | |
|---|---|---|---|---|
| 397,002 A | * | 1/1889 | Isaacs | 54/55 |
| 540,439 A | * | 6/1895 | Hayward | 278/114 |
| 4,158,907 A | * | 6/1979 | Spinosa et al. | 24/600.9 |
| 5,274,887 A | * | 1/1994 | Fudaki | 24/265 H |
| 5,608,926 A | | 3/1997 | Donaton | 4/503 |

FOREIGN PATENT DOCUMENTS

GB        2192926 A  *  1/1988

* cited by examiner

*Primary Examiner*—James R Brittain
(74) *Attorney, Agent, or Firm*—Kenneth P. Robinson

(57) ABSTRACT

Swivel hook units are usable to position a fabric cover, such as a swimming pool cover. A base portion of unitary construction can be attached to a fabric cover via a strap sewn to the cover. A hook member is attached to the base portion via a fastener device which permits rotational displacement of the hook member to accommodate adjustment during installation. A single rivet-type fastener device may be employed. A swivel hook unit may have a flat bottom for placement against a fabric cover without protrusions which would facilitate abrasion of the cover fabric during use. A flexible member to restrain the hook member from unintended disconnection from an eyebolt may include an end section contour configuration to resist lateral displacement of the flexible member relative to the hook member.

12 Claims, 3 Drawing Sheets

US 7,490,389 B1

SWIVEL SNAP HOOK UNIT

RELATED APPLICATIONS (Not Applicable)

FEDERALLY SPONSORED RESEARCH (Not Applicable)

BACKGROUND OF THE INVENTION

This invention relates to hook units and, more specifically, to hook units usable to position and retain in place a fabric cover, such as a cover for a swimming pool.

In many areas residential swimming pools, such as in-ground pools, are in use for only part of each year. During periods of non-use it is common to provide a sturdy fabric cover positioned over the open area of the pool, particularly to prevent children from falling into an unattended pool and to limit entry of debris into the water.

A pool cover may be constructed of strong fabric resistant to degradation in the presence of moisture, sunlight and other environmental factors. A cover may be porous or have a drainage configuration to mitigate the buildup of water from rain and snow, while still limiting the passage of debris into the pool cavity below the cover which will typically contain water even during periods of non-use.

A variety of arrangements have been proposed for securely retaining a cover in place over a pool. In particular, a common objective is to retain the edges of the pool cover securely in close adjoining relationship to the sides or walls of the pool, so as to reduce the potential for gaps between the cover and the pool wall which could permit entry of a child or debris past the cover and into the pool cavity.

Hooks for pool cover applications may take the form of a hook to go through an eyebolt extending from the side wall of a swimming pool, with the hook fixed to a base plate attached to the lower surface of the pool cover fabric adjacent an edge. In some instances, an eyebolt may not be at a position accurately aligned with the position of the corresponding hook attached to the pool cover fabric, or an eyebolt may become somewhat bent to one side during the time when the pool cover is not installed. In such circumstances a fixed-position hook cannot be adjusted for the lateral discrepancy in eyebolt position and when attached the cover may be rippled or distorted. Also, in general, a hook may be subject to being unhooked from its position through an eyebolt if the hook assembly has inadequate provision for preventing the hook from being inadvertently removed from the eyebolt. Further, for a hook assembly which does not have a flat surface positionable against the pool cover, edges or protrusions from such surface may undesirably facilitate wear points or cuts to the pool cover fabric under adverse wind, contact or other conditions occurring after installation.

While a variety of hook designs have been proposed for cover retention, full structural reliability, cover protection, ease of use and adaptability to different configurations of installation have generally not been achieved by prior hook designs.

Objects of the present invention are to provide swivel hook units of improved configuration and hook units which may avoid one or more disadvantages or shortcomings of previously available hooks, such as prior hooks intended for use with fabric covers.

SUMMARY OF THE INVENTION

A swivel hook unit, usable to position a fabric cover, includes an elongated base portion having at least one opening usable to secure the base portion to the fabric cover, a hook member having a free end section with a predetermined cross section, and a fastener attaching the hook member to the base portion and permitting some rotational displacement of the hook member relative to the base portion. The hook unit may also include an elongated flexible member attached at one end to the base portion and extending to a distal end contiguous to the free end section of the hook member and configured to resist lateral displacement away from that free end section. For this purpose, the distal end may include a contour complementary to the free end section of the hook member.

For a better understanding of the invention, together with other and further objects thereof, reference is made to the following description, taken in connection with the accompanying drawings and the scope of the invention will be pointed out in the accompanying claims.

DESCRIPTION OF THE INVENTION

Figure 1:
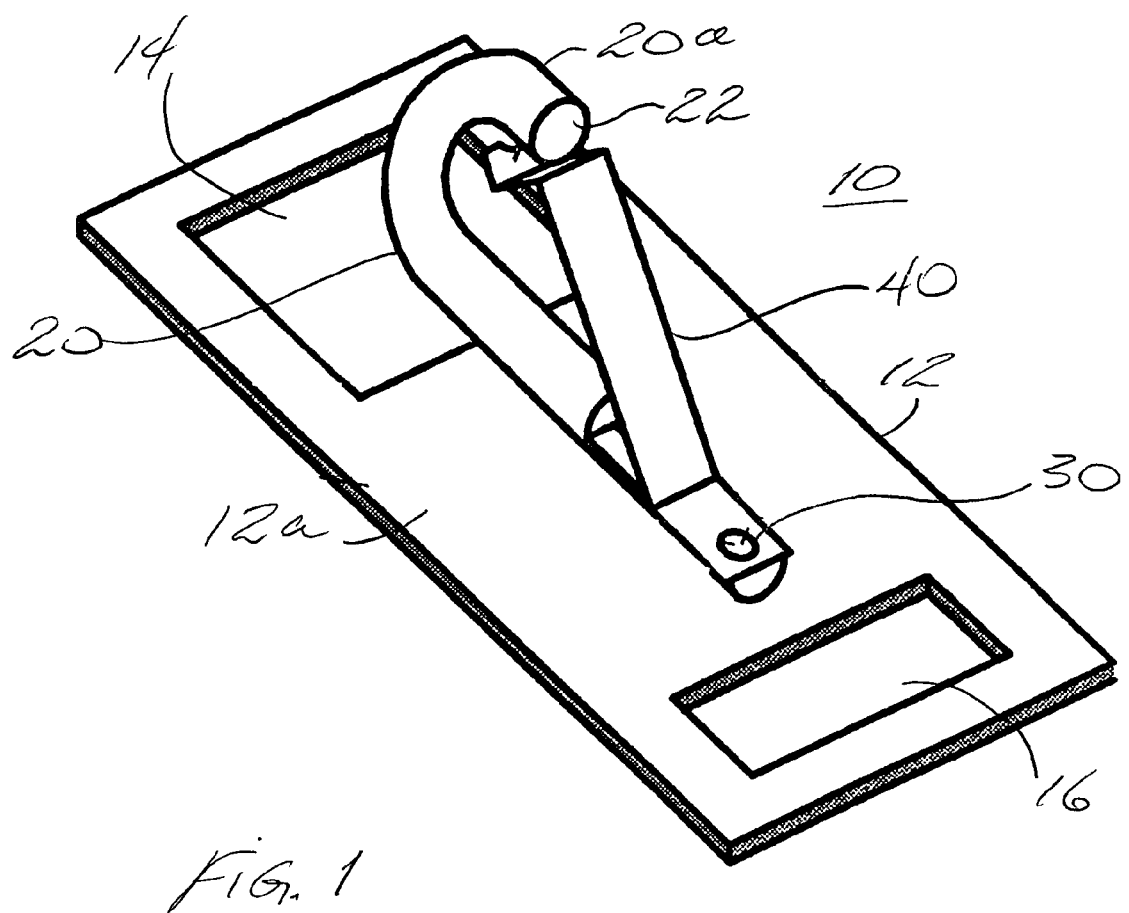
FIG. 1 is a three dimensional type view of a swivel hook unit utilizing the invention.
Figure 2:
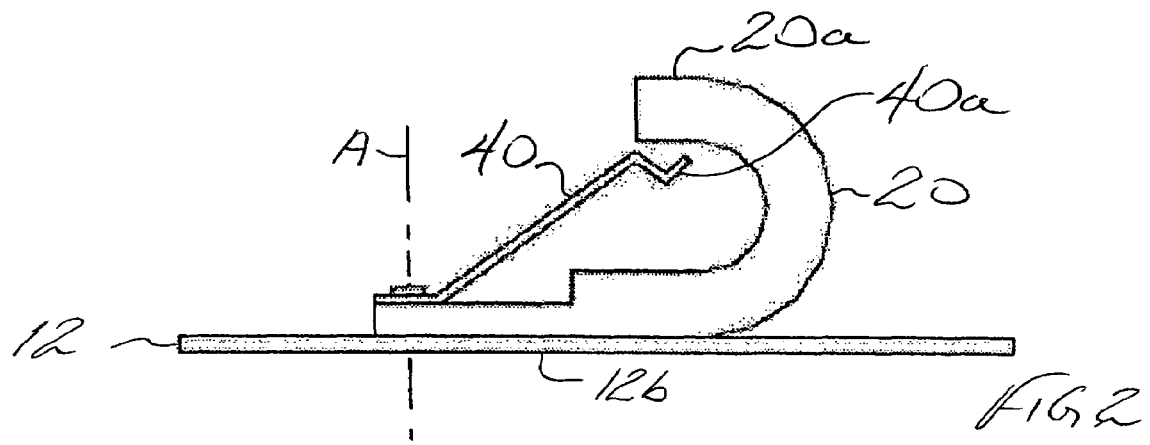
FIG. 2 is a side view of the FIG. 1 swivel hook unit.
Figure 3:
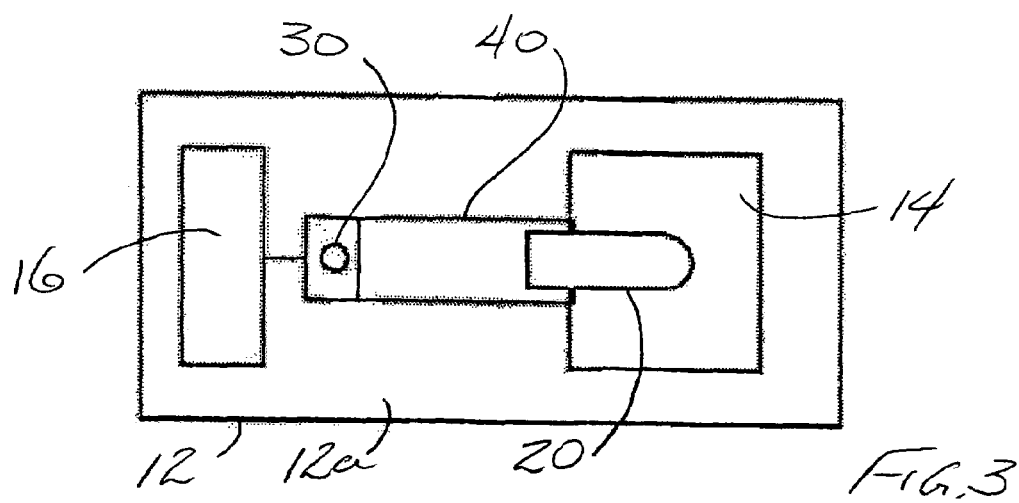
FIG. 3 is a plan view of the FIG. 1 swivel hook unit.
Figure 4:
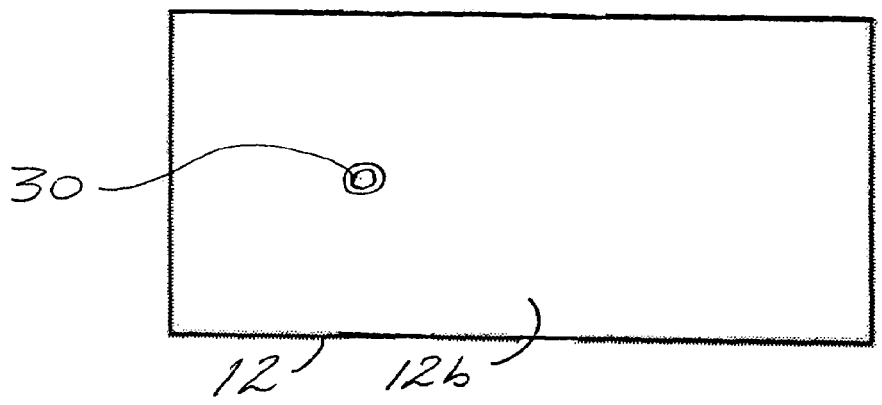
FIG. 4 is a bottom view of the FIG. 1 swivel hook unit.

FIG. 1 is a three dimensional type view of an embodiment of a swivel hook unit 10 utilizing the invention. FIGS. 2, 3 and 4 are respective side, plan and bottom views of the FIG. 1 swivel hook unit. In this embodiment the swivel hook unit, which is usable to position a fabric cover, such as a swimming pool cover, includes the following.

Elongated base portion 12 has at each end an enclosed opening 14, 16 usable to attach the base portion 12 to a fabric cover. Attachment may be accomplished by use of a length of flexible strapping material which passes through one or both of openings 14, 16 and is securely sewn to the fabric cover. The base portion has a first main surface 12a and a second main surface 12b visible in FIG. 4. In a presently preferred embodiment, base portion 20 is of unitary construction and is formed from stainless steel plate stock.

Hook member 20 has a free end section 20a with a predetermined cross section 22, e.g., circular cross section as shown in FIG. 1. In this embodiment hook member 20 comprises a curved section of circular cross section stainless steel stock, which is partially flattened at a lower part of the hook member which is adjacent to surface 12a of base portion 12.

Figure 6:
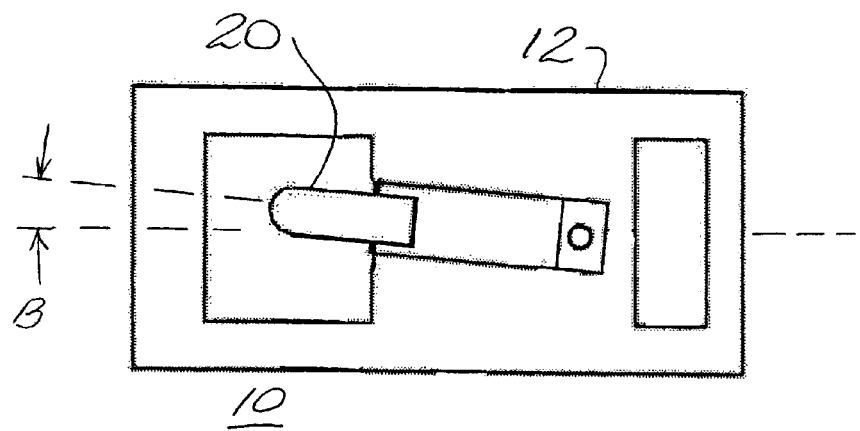
FIG. 6 is a plan view of the FIG. 1 swivel hook unit with the hook member rotationally displaced for adjustment during installation.

Fastener device 30 attaches hook member 20 to base portion 12. The fastener device, which may consist of a single rivet, screw, bolt or other suitable device, is arranged to permit some rotational displacement of hook member 20 relative to base portion 12. In some applications, full 360° rotation of the hook member may be permitted, while in other applications it may be appropriate to permit limited rotation (e.g., 20° to either side). An example of such rotational displacement is shown in FIG. 6, which will be further discussed. Fastener device 30 may extend through hook member 20 (and flexible member 40, to be described) and into base portion 12. For example, with use of a rivet, the rivet may extend into and through the base portion, with the rivet end somewhat expanded to provide retention. For present purposes, a "rivet-type device" is defined as a rivet, screw, bolt or other device suitable for use as described. As will be understood by skilled persons, the various elements of the swivel hook unit may be formed of any suitable materials and with shapes, form and dimensions adequate to provide strength appropriate in view of the conditions of use in particular implementations and applications.

Figure 7:
FIG. 7 is a detail view of a portion of a component of a swivel hook unit.

Elongated flexible member 40 may also be included. As illustrated, flexible member 40 is attached at one end to the base portion 12 and extends to a distal end 40a contiguous to the free end section 20a of the hook member. Distal end 40a is visible in FIG. 2, with detail shown in FIG. 7. As illustrated, flexible member 40 is arranged to provide a "keeper" function to deter unintentional or undesired removal of hook member 20 after installation (e.g., accidental removal from engagement with an eyebolt in the period after installation of a swimming pool cover). Consistent with this function, flexible member 40 may be configured to resist lateral displacement of the distal end 40a away from its position contiguous to free end section 20a of hook member 20. In one embodiment, the distal end 40a may have a profile which is partially circular as illustrated in the enlarged view of FIG. 7, whereby when relative movement between the hook member and an engaged eyebolt, for example, causes the eyebolt to apply pressure against the flexible member, distal end 40a will fully engage free end section 20a. Thus, under conditions experienced after installation, an eyebolt hooked on hook member 20 may assert pressure against flexible member 40, which will tend to press the semi-circular contour of distal end 40a against the circular contour of free end section 20a, so that the configuration of distal end 40a will provide increased resistance to lateral displacement of flexible member 40. In this manner, the keeper function of flexible member 40 may be enhanced to resist escapement of hook member 20 from engagement to an eyebolt, for example. Flexible member 40 may be formed of thin stainless steel or other suitable material having form retention properties enabling member 40 to return to its original shape after having been depressed toward the base portion.

As shown in FIGS. 2 and 4, the swivel hook unit has a second main surface 12b which has an absence of protrusions in this embodiment, so that there are no protrusions which would facilitate occurrence of wear points or cuts in the cover fabric under adverse wind, contact or other conditions experienced during use. As represented in FIG. 4, the lower end of fastener 30 may be recessed into the second main surface 12b and result in no protrusion, as represented in FIG. 2, or a protrusion of only limited extent.

Figure 5:
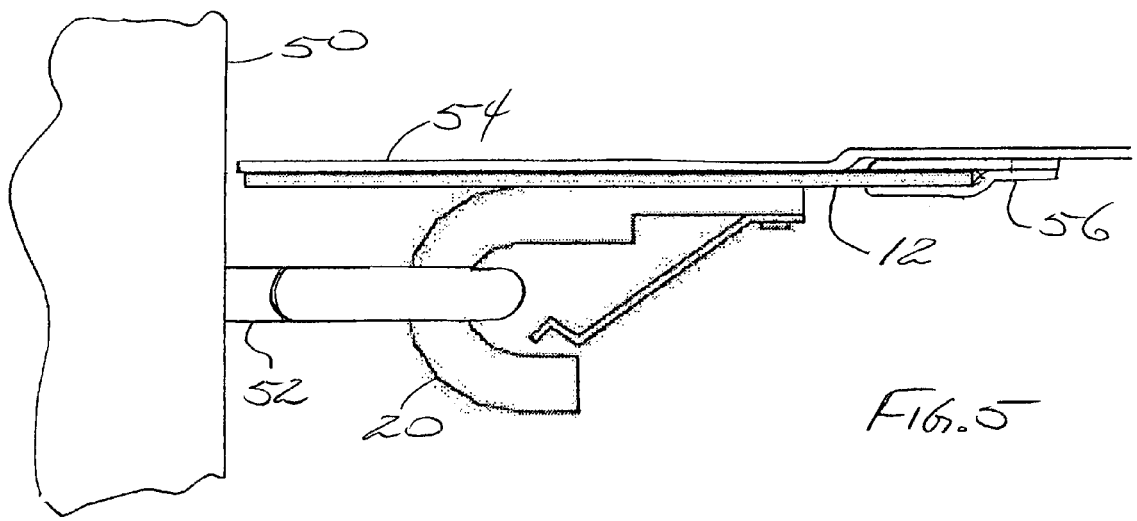
FIG. 5 is a side view of the FIG. 1 swivel hook unit attached to a pool cover and engaging an eyebolt mounted in the wall of a swimming pool.

Referring now to FIG. 5, a sideward view of a section of a swimming pool wall 50 is illustrated with an eyebolt 52 extending from wall 50. Eyebolt 52 may be of a standard or other form. In this view the side of the open "eye" portion of the eyebolt is seen. While the opening in the eyebolt would be visible to a person looking down into the pool, it is not visible in the side view of FIG. 5. As shown, hook member 20 of a swivel hook unit of the type of FIG. 1 is hooked onto (i.e., engaged with) eyebolt 50. FIG. 5 thus illustrates the combination of the swivel hook unit positioned under an edge portion of a fabric cover 54 (e.g., a swimming pool cover), with the swivel hook unit attached to cover 54 by a portion of strap 56 which passes through end opening 16 (shown in FIG. 3) of base portion 12 and strap 56 stitched or otherwise attached to the cover 54. In this configuration, the swivel hook unit is intended to hold the fabric cover in a desired position or relationship with respect to the wall 50.

FIG. 6 is a plan view of swivel hook unit 10 of FIG. 1 illustrating rotational displacement of the hook member 20 relative to the base portion 12 (i.e., rotation about axis A represented in FIG. 2). In FIG. 6, the hook member 20 has been rotated through angle B to a position approximately 5° rotated from the horizontal center line of the base portion as shown. In an instance in which an eyebolt in a pool wall, for example, is not at a position accurately aligned with the position of a corresponding hook member attached to pool cover fabric, or the eyebolt has become bent or displaced to one side, this rotational displacement capability may permit the hook member to be rotated to a position to accommodate engagement with the eyebolt. As a result, the cover may be capable of installation without requiring physical modification of the position of either the swivel hook unit on the cover or the eyebolt in the pool wall and this result may be accomplished without causing rippling or other disturbance of uniformity of the cover configuration as installed.

Use of the swivel hook unit has been described in the exemplary context of a swimming pool cover, however, with an understanding of the invention skilled persons will be enabled to implement a variety of embodiments appropriate for use with other cover applications and installations.

While there have been described the currently preferred embodiments of the invention, those skilled in the art will recognize that other and further modifications may be made without departing from the invention and it is intended to claim all modifications and variations as fall within the scope of the invention.

What is claimed is:

1. A swivel hook unit, usable to position a fabric cover, comprising:
    an elongated base portion having at least one opening usable to secure the base portion to the fabric cover;
    a hook member having a free end section with a predetermined cross section;
    a fastener device attaching said hook member to said base portion and permitting some rotational displacement of the hook member relative to the base portion; and
    an elongated flexible member attached at one end to said base portion and extending to a distal end contiguous to said free end section, said distal end including a contour complementary to said predetermined cross section of the free end section of the hook member;
    said fastener device being a single rivet, which extends through said hook member and said flexible member and into said base portion.

2. A swivel hook unit as in claim 1, wherein said contour of the distal end of the flexible member is configured to cooperate with said cross section of the free end of the hook member to resist lateral displacement of the flexible member away from said free end section of the hook member.

3. A swivel hook unit as in claim 1, wherein said flexible member is arranged for rotational displacement with said hook member.

4. A swivel hook unit as in claim 1, wherein said fastener device is configured to permit at least limited rotational displacement of the hook member about an axis normal to a main surface of the base portion.

5. A swivel hook unit as in claim 1, wherein said free end section of the hook member has a circular cross section and said contour of the distal end of the flexible member is partially circular.

6. A swivel hook unit, usable to position a fabric cover, comprising:
- an elongated base portion having at least one opening usable to secure the base portion to the fabric cover;
- a hook member having a free end section with a predetermined cross section;
- an elongated flexible member attached at one end to said base portion and extending to a distal end contiguous to said free end section of the hook member; and
- a fastener device attaching said hook member to said base portion and permitting some rotational displacement of the hook member relative to the base portion;
- said fastener device being a single rivet, which extends through said hook member and said flexible member and into said base portion.

7. A swivel hook unit as in claim 6, wherein said fastener device is configured to permit at least limited rotational displacement of the hook member about an axis normal to a main surface of the base portion.

8. A swivel hook unit as in claim 6, wherein said opening in the base portion is configured to permit insertion of a strap attached to said fabric cover.

9. A swivel hook unit, usable to position a fabric cover, comprising:
- an elongated base portion having at least one opening usable for securing the base portion to the fabric cover and having first and second main surfaces;
- a hook member having a free end section with a predetermined cross section;
- an elongated flexible member attached at one end to said base portion and extending to a distal end contiguous to said free end section of the hook member;
- a fastener device attaching said hook member to said first main surface of the base portion and permitting some rotational displacement of the hook member relative to the base portion;
- said second main surface of the base portion having an end of said fastener device recessed therein and having an absence of other protrusions to contact said fabric cover when secured thereto;
- said fastener device being a single rivet, which extends through said hook member and said flexible member and into said base portion.

10. A swivel hook unit as in claim 9, wherein said fastener device is configured to permit at least limited rotational displacement of the hook member about an axis normal to a main surface of the base portion.

11. A swivel hook unit as in claim 9, wherein said flexible member is arranged for rotational displacement with said hook member.

12. A swivel hook unit as in claim 9, wherein said opening in the base portion is configured to permit insertion of a strap attached to said fabric cover.

* * * * *